United States Patent [19]

Bigelow

[11] Patent Number: 5,581,417
[45] Date of Patent: Dec. 3, 1996

[54] APPARATUS AND METHOD FOR ANHYSTERETICALLY RECORDING FROM MASTER DRUM TO SLAVE WEB

[75] Inventor: Donald O. Bigelow, Webster, N.Y.

[73] Assignee: Eastman Kodak Company, Rochester, N.Y.

[21] Appl. No.: 989,300

[22] Filed: Dec. 11, 1992

[51] Int. Cl.⁶ .................................................. G11B 5/86
[52] U.S. Cl. ............................................................ 360/17
[58] Field of Search ...................... 360/15–17; 252/62.55

[56] References Cited

U.S. PATENT DOCUMENTS

| | | | |
|---|---|---|---|
| 2,974,307 | 3/1961 | Wiener | 340/172.5 |
| 3,609,724 | 9/1971 | Allison | 340/174.1 |
| 3,630,424 | 6/1970 | Rau | 226/95 |
| 3,703,612 | 11/1972 | Higashida et al. | 179/100.2 E |
| 3,782,947 | 1/1974 | Krall | 96/67 |
| 3,825,948 | 7/1974 | Hendershot, III et al. | 360/16 |
| 4,110,797 | 8/1978 | Hoshino et al. | 360/17 |
| 4,193,099 | 3/1980 | Hayashi | 360/17 |
| 4,194,661 | 3/1980 | Grant | 226/95 |
| 4,277,806 | 7/1981 | Jeffers et al. | 360/17 X |
| 4,302,523 | 11/1981 | Audran | 430/140 |
| 4,341,363 | 7/1982 | Inatome | 360/73 X |
| 4,542,062 | 9/1985 | Takada et al. | 428/336 |
| 4,631,202 | 12/1986 | Opfer | 427/131 |
| 4,654,276 | 3/1987 | Ahlert | 428/641 |
| 4,889,269 | 12/1989 | Long et al. | 226/97 |
| 4,998,658 | 3/1991 | DiStefano | 226/95 |
| 5,155,535 | 10/1992 | Bermel et al. | 355/274 |
| 5,230,818 | 7/1993 | James et al. | 252/62.55 |

FOREIGN PATENT DOCUMENTS 0240025  10/1987  European Pat. Off. .......... G11B 5/86

OTHER PUBLICATIONS

*IBM Technical Disclosure Bulletin*, vol. 10, No. 11, Apr. 1968, pp. 1710–1711, "Sink to Control Noise in an Externally Pressurized Air Bearing".

Primary Examiner—Aristotelis Psitos
Attorney, Agent, or Firm—Clyde E. Bailey, Sr.

[57] ABSTRACT

A ported vacuum drum (20, 56–98) is provided on its exterior cylindrical surface (22) with a master layer (24) of magnetic recording medium in position to contact a slave layer (14) of magnetic recording medium provided on one side and along at least one edge of a web (10); so that, vacuum applied (74–82) between the cylindrical surface and the web at locations (88–94) spaced from the zone of contact (98) between the recording media will hold the slave layer on the web securely in contact with the master layer on the drum as the drum rotates, thereby permitting anhysteretic recording from the master layer to the slave layer. A method of anhysteretically recording is taught.

20 Claims, 5 Drawing Sheets

APPARATUS AND METHOD FOR ANHYSTERETICALLY RECORDING FROM MASTER DRUM TO SLAVE WEB

TECHNICAL FIELD

The invention concerns transferring recorded information from one magnetic medium to another. More particularly, the invention concerns apparatus and methods for anhysteretically recording from a high coercivity master medium carried on a rotatable, circular cylindrical drum to a lower coercivity slave medium carried on a web of indeterminate length wrapped on the drum; so that, information previously recorded on the master medium is recorded repeatedly along the length of the slave medium as the cylindrical drum rotates and the web translates in contact with a portion of the cylindrical drum.

BACKGROUND ART

Conventional magnetic recording requires a stationary recording head which makes contact with a moving surface of a magnetic medium, which may be in web, disk or drum form. Because of the tendency of such heads to abrade the magnetic medium, at least the surface layer of the magnetic medium generally is made from a durable material selected to resist abrasion. In recent years, photographic films have been developed which include on one side of a base material, various layers of photosensitive materials; and on the other side, a thin, virtually transparent layer of magnetic medium. The magnetic medium can be used, for example, during manufacture of the film to record information related to the film's characteristics; during use of the film in the camera to enable the camera to read and adjust itself in response to previously recorded information and/or to record information about camera settings and scene characteristics; and during processing or developing of the film to enable the processing equipment to read previously recorded information and adjust the processing parameters accordingly. However, because of the presence of the magnetic medium in a photographic film, the properties of the surface layer of the magnetic medium are chosen more for their photographic suitabilities than for their resistance to the sort of abrasion which can occur due to contact with a stationary recording head in a conventional recording process. Any abrasion on the film surface must be avoided since it would degrade the optical properties of the film and thereby prevent capture and reproduction of high quality images. As a result, if conventional recording apparatus were used to record to the magnetic recording medium on such a film, there would be a danger that the portion of the film containing the magnetic medium would be damaged due to abrasion. Use of a contact head is acceptable in a camera due to the low speed of recording and reading, but would not be acceptable in a high speed film manufacturing process. Moreover, even if a small amount of abrasion were acceptable in a manufacturing process, the abraded material would tend to build up on the recording head, thereby increasing the gap between the head and the recording medium and potentially degrading the signal applied to the recording medium to an unacceptable level. Also, such abraded material would tend to break loose from the head, resulting in loose dirt on the film which would degrade performance.

Another type of recording process, known as anhysteretic recording, has been used for many years for duplication of magnetic media, particularly video and audio tapes, without requiring the use of a recording head which may abrade the media. In this process, a master magnetic medium is prepared which typically has a magnetic coercivity about two to three times higher than the coercivity of the slave medium on which duplicate copies are to be made. The master medium may be provided in web or drum format and is prerecorded with the information to be duplicated. The master medium and the slave medium are then brought into intimate, stable contact, with no relative motion, in the presence of a decaying, alternating magnetic bias field; so that, a mirror image of the information on the master is transferred to the slave.

Since there is no abrasion between the master and slave media in conventional apparatus and processes useful for anhysteretic recording, the application of such apparatus and processes to record to photographic film having a magnetic medium would appear promising. However, recording to a photographic film introduces a number of problems not found in conventional duplicating of video and audio tapes. For example, applications for still camera photography will require recording of digital signals of relatively low bit density due to the characteristics of the magnetic medium on the film, likely no higher than 1000 bits per inch (39.4 bits per millimeter) which means that recording onto the film must be done with a very high degree of reliability since redundant recording will not be feasible. Much higher bit densities typically are used for data, video and audio applications, such as 10,000 bits per inch (394 bits per millimeter) for digital tape, 6,000 bits per inch (236 bits per millimeter) for floppy disks and 10,000 bits per inch (394 bits per millimeter) for Winchester disks. So that conventional, contact head equipment for reading the signals recorded to the photographic film will not damage the central image area of the film, it is desired to record only along the very edges of the film, rather than in the central portion of the magnetic medium as would be the case for non-photographic applications. Because the well known anticlastic effect will cause the edges of the slave medium to curl away slightly from an underlying master medium in drum format, intimate contact may be reduced in the very area where recording is desired. This effect is more pronounced with a photographic film than with a conventional magnetic tape for given levels of tension and elastic modulus, since the film is several times thicker than such tape. Moreover, air tends to become entrained between the slave and master media during recording at manufacturing web transport speeds, which causes loss of intimate contact and prevents good signal transfer from the master medium to the slave medium, particularly at higher velocities and with wider webs.

Pinch rollers have been used to squeeze air from between the media; but with a pressure sensitive photographic film, such rollers are undesirable since they may cause images on the exposed film to exhibit unsightly pressure marks. Various types of air clamping devices are also known which apply elevated pressure air to the media to force air from the interface and bring the media into the desired intimate contact. However, such devices tend to be very noisy, can actually cause instabilities by forcing air into the interface and are expensive to operate due to their continuous need for compressed air. Where the master medium and the slave medium are both in web format, recording onto a slave photographic film with the magnetic medium on the back of the film in some arrangements would require that the emulsion side of the film be in contact with a backing roll for the master and slave media, which may cause damage to the emulsion.

Thus, a need has existed for improvements to conventional apparatus and methods for anhysteretic recording to suit them for recording to photographic films bearing magnetic media. More particularly, a need has existed for anhysteretic recording apparatus and methods which can record along the edges or at the central portion of a photographic film, with low signal density and low loss of signal and which can efficiently remove air from the interface between the media being recorded at high speeds without risking pressure marking of or other damage to the film.

SUMMARY OF THE INVENTION

Such problems are solved and needs are met with the apparatus of the invention, which is particularly suited for anhysteretically recording information on a web bearing a first, magnetic recording medium, the web having a first pair of opposed edges separated by a first width of the web. In a preferred embodiment, the apparatus comprises a circular cylindrical drum having an exterior cylindrical surface with a second pair of opposed edges separated by a second width which preferably is at least as long as the first width. The cylindrical drum can be narrower than the web in applications where edge burrs on the web are to be avoided or the central portion of the web is to be used for recording. At least one layer of a second, magnetic recording medium is applied to the cylindrical surface, the layer extending in a band around the cylindrical surface. The band is positioned to contact the first, magnetic recording medium, when such a web is wrapped onto the drum, to anhysteretically transfer information in an annular zone defined by the interface between the band and the web, preferably along at least one of the first, opposed edges. Means are associated with the drum for applying subatmospheric pressure between the drum and the web at locations spaced from the annular zone, to cause the web to establish intimate contact with the drum in the annular zone. For simplicity in manufacture, the layer preferably extends across the cylindrical surface to contact the first, magnetic recording medium in a pair of annular zones, one along each of the first, opposed edges. The means for applying subatmospheric pressure may comprise a plurality of circumferential and axial grooves in the circumferential surface of the drum, the axial grooves intersecting the circumferential grooves; a plurality of radial bores extending from the grooves into the drum; and means for applying subatmospheric pressure to the radial bores over an arc of a circumference of the drum, whereby subatmospheric pressure is applied to the interface between the web and the drum. Except for the presence of the second magnetic recording medium, the cylindrical drum may be of the general type shown in commonly assigned U.S. Pat. No .3,630,424, incorporated into this specification by reference, which is provided in the familiar manner with a stationary interior porting unit to limit the application of vacuum to a portion of the circumference of the drum.

In a preferred embodiment, the magnetic recording medium on the web has a coercivity in the range of 500 to 1500 Oe; and the magnetic recording medium on the drum has a coercivity in the range of 1900 to 2600 Oe. The magnetic recording medium on the web may be of the type shown in commonly assigned U.S. Pat. Nos. 3,782,947 and 4,302,523, in Research Disclosures Item 34390 of Nov. 1992 and in commonly assigned published International Application No. WO 91/11750. The magnetic recording medium on the drum preferably is an 80/20 alloy of cobalt and platinum, the layer having been sputtered onto said cylindrical surface. The alloy may be applied by sputtering using the method discussed later in this specification, which also is disclosed in commonly assigned U.S. Pat. application Ser. No. 07/905,026 filed 26 June 1992.

Apparatus embodying such a drum may include means for driving the drum at an essentially constant velocity to meter the web through the apparatus; a first means, upstream of the drum, for applying tension to the web approaching the drum; and a second means, downstream of the drum, for applying tension to the web leaving the drum. Alternatively, apparatus embodying such a drum may include means for mounting the drum for rotation essentially as an idler roll in response to movement of the web; means for applying tension to the web approaching the drum; a metering roll downstream of the drum; means for driving the metering roll at an essentially constant velocity to meter the web through the apparatus; and means for applying tension to the web leaving the metering roll. In both cases, an essentially constant velocity is preferred to facilitate stabilization of the interface between the drum and the web.

The method of the invention is especially suited for anhysteretically recording information on a web bearing a first, magnetic recording medium, the web having a first pair of opposed edges separated by a first width of the web. A circular cylindrical drum is provided which has an exterior cylindrical surface with a second pair of opposed edges separated by a second width preferably at least as long as the first width; and at least one layer of a second, magnetic recording medium applied to the cylindrical surface. The layer extends in a band around the cylindrical surface in position to contact the first, magnetic recording medium, when such a web is wrapped onto the drum, to anhysteretically transfer information in an annular zone defined by the interface between the band and the web, preferably along at least one of the first, opposed edges. The web is wrapped around an arc of the cylindrical surface to define the interface and subatmospheric pressure is applied through the cylindrical surface at the interface at locations spaced from the annular zone, to cause the web to establish intimate contact with the drum in the annular zone. The drum is rotated; and a magnetic bias field is applied to cause the transfer.

A number of advantageous effects are achieved with the apparatus and method of the invention. The information to be recorded onto the slave medium can be recorded onto the master drum at slow speed off the normal production line, using a flexibly mounted recording head which touches or nearly touches the surface of the drum. An intimate interface can be achieved between the master and slave media at the edges of the web for manufacturing web transport speeds as high as 600 feet (182.88 m) per minute for webs as thick as 0.0056 inch (0.014 cm). The apparatus can be readily manufactured using currently available manufacturing techniques and can be easily maintained. Recording along the edges of the web is achieved, though recording in the central area can be achieved by reconfiguring the vacuum ports. The apparatus and method permit recording onto a mechanically sensitive web such as photographic film without damage to the film's mechanical or photographic properties.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
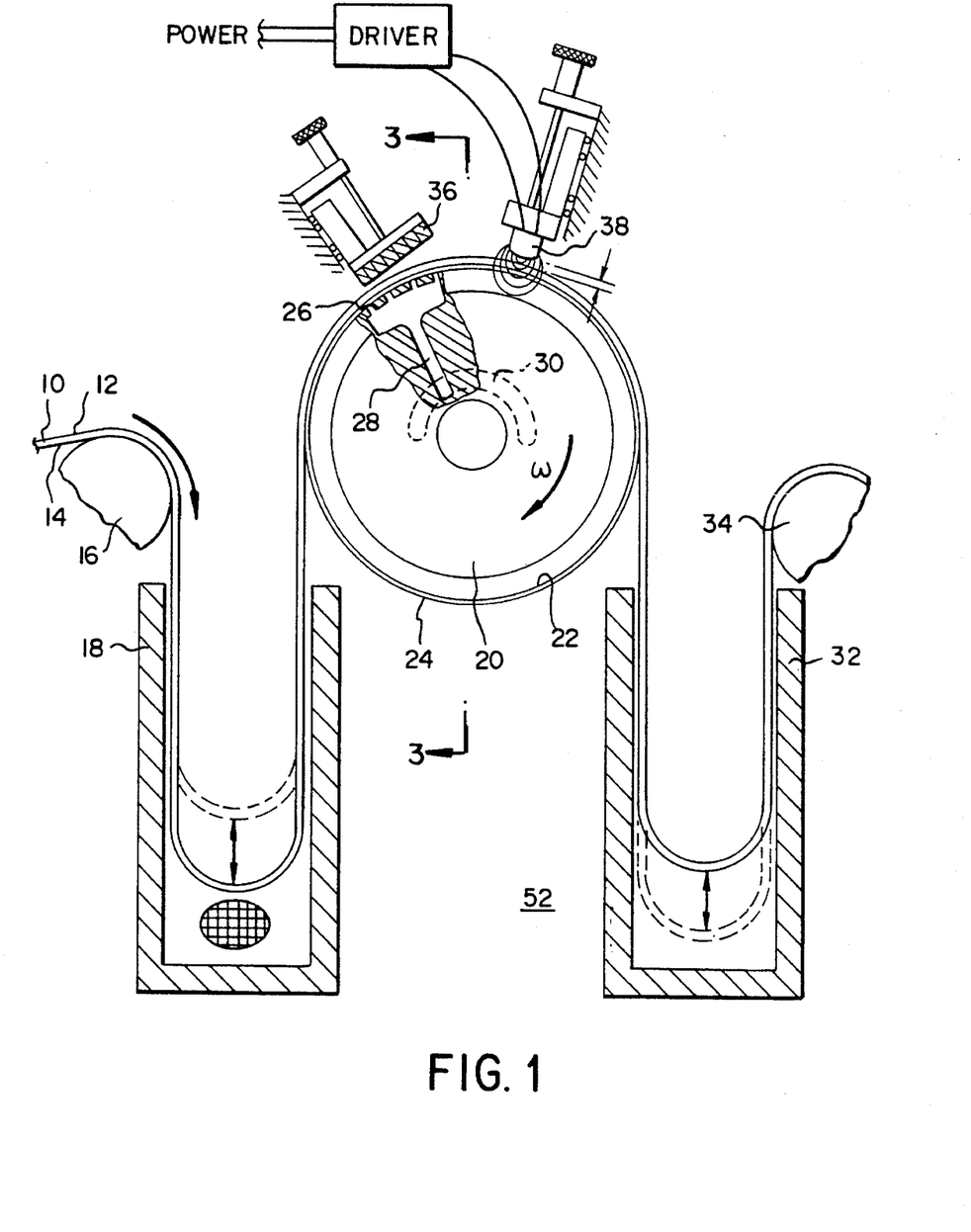
FIG. 1 shows a schematic elevation view of one type of apparatus for anhysteretic recording embodying the invention.
Figure 2:
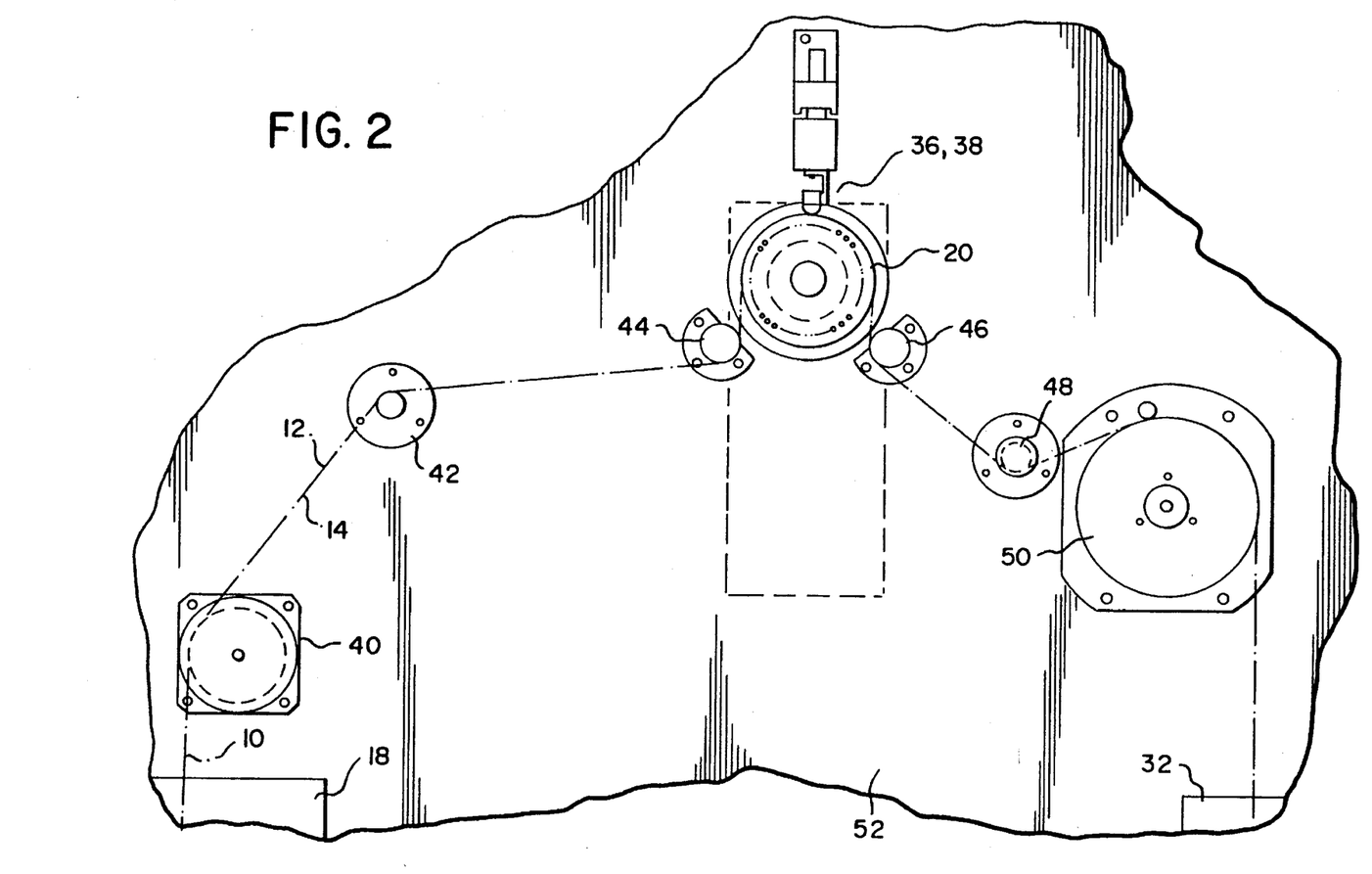
FIG. 2 shows a schematic elevation view of another type of apparatus for anhysteretic recording embodying the invention.

As shown in FIGS. 1 and 2, the apparatus of the invention is particularly useful for recording onto a web 10 which comprises an acetate or plastic base having one side 12 with layers of photographic emulsions and another side 14 with a slave layer of a magnetic recording medium having a mean coercivity in the range of 500 to 1500 Oe. Web 10 is supported and led into the apparatus of FIG. 1 over an air bar or roller 16 with emulsion side 12 facing outward and then downward into a conventional infeed vacuum box 18 which maintains tension on the web, preferably in the range of 0.5 to 1.25 pounds per inch (0,089 to 0,223 kg per cm) of web width. After leaving vacuum box 18, web 10 is wrapped approximately 180° around a circular, cylindrical vacuum and recording drum 20 according to the invention, which in the embodiment of FIG. 1 preferably is driven by a constant speed motor, not illustrated. As seen schematically in FIG. 1, drum 20 comprises an exterior cylindrical surface 22 which supports a master layer 24 of a magnetic recording medium, such as an 80/20 alloy of cobalt and platinum sputter deposited on a chromium underlayer. Layer 24 preferably extends as a continuous circumferential band from edge to edge of drum 20; however, a centrally positioned band or a separate band along one or both edges of the drum is also within the scope of the invention. Layer 24 typically has a thickness in the range of 400 to 500 nm but is shown with a greatly exaggerated thickness in FIGS. 1 and 6, for ease of illustration. A preferred method for applying layer 24 will be discussed later in this specification. As will be discussed in detail with regard to FIGS. 3 to 6, layer 24 and surface 22 are precisely machined to include an array 26 of axially and circumferentially extending grooves and radially extending ports which are in communication with a plurality of interior channels 28 within drum 20, only one of such channels 28 being illustrated for simplicity. As shown in phantom lines in FIG. 1, such channels 28 communicate with a stationary interior porting unit having an approximately 180° exhaust port 30 connected to a suitable source of subatmospheric pressure. Thus, when surface 14 moves into contact with drum 20 opposite exhaust port 30, subatmospheric pressure is applied to the interface between surface 14 and layer 24 to remove entrained air via array 26 and thus to draw web 10 into intimate contact with drum 20. Circumferential slip between web 10 and drum 20 also is eliminated. As drum 20 is rotated, it pulls web 10 along until channels 28 move out of communication with exhaust port 30, whereupon web 10 is released progressively from drum 20 to move into an outfeed vacuum box 32, from which it passes over a further air bar or roller 34 and out of the apparatus of the invention.

Infeed vacuum box 18 provides a web tensioning and slack takeup link between the constant velocity drum 20 and the source of supply of web 10, not illustrated. Those skilled in the art will appreciate that a servo system, not illustrated, can be used to monitor the position of the loop of web 10 in vacuum box 18 and then control the source of supply of web 10 as necessary to maintain an essentially constant position of the loop. The same sort of control scheme can be applied at outfeed vacuum box 32, except that loop position is maintained by controlling the rate of takeup of web 10 downstream of air bar 34. Thus, essentially constant tension is maintained as web 10 is removed from infeed vacuum box 18 and added to outfeed vacuum box 34 by the continuous, preferably constant velocity rotation of drum 20, which acts as a web metering device. Web tension could also be maintained with a simple dancer or accumulator mechanism, as will be understood by those skilled in the art.

While web 10 is being held in intimate contact with drum 20, a magnetic bias field is applied by either an array 36 of permanent bias magnets, of the type shown in commonly assigned, copending U.S. application Nos. 656,667 and 704,816 filed 19 Feb. 1991, or a conventional inductive bias head 38 or erase head of the type familiar to those skilled in the magnetic recording art. For simplicity, both array 36 and head 38 are shown in FIG. 1, though only one or the other would be used in an actual production apparatus. Array 36 and head 38 may be mounted on suitable movable stages to permit adjustment of the magnetic gap, as illustrated schematically. Due to the presence of the alternating, decaying bias field and the intimate contact between web 10 and drum 20, information previously recorded on layer 24 is anhysteretically recorded onto the magnetic recording medium on side 14 of web 10. For apparatus using array 36, the speed of drum 20 during anhysteretic transfer may be varied and can be quite high. However, when head 38 is used, operating speed also may be varied but may be limited by the maximum frequency at which the head can be driven reliably.

FIG. 2 shows another anhysteretic recording apparatus embodying the invention. Here, web 10 passes from vacuum box 18 over an air bar 40, over a roller 42, beneath an air bar 44 and then wraps approximately 180° around drum 20, which in this instance is mounted for rotation as an idler roll. That is, drum 20 is not driven by a separate motor but rotates in response to movement of web 10. From drum 20, web 10 passes beneath an air bar 48 and then wraps approximately 120° around a conventional, ported vacuum drum 50 which is driven by a preferably constant speed motor, not illustrated, to pull web 10 through the apparatus. From metering drum 50, web 10 passes into outfeed vacuum box 32 before leaving the apparatus. A control scheme similar to that previously described can be applied to this embodiment of the apparatus of the invention. The apparatus of FIG. 1 is preferred since it does not require the web to provide the torque needed to overcome the inertia of drum 20, as in the case of the apparatus of FIG. 2. Also, the apparatus of FIG. 2 tends to cause more variation in web tension than that of FIG. 1.

Figure 3:
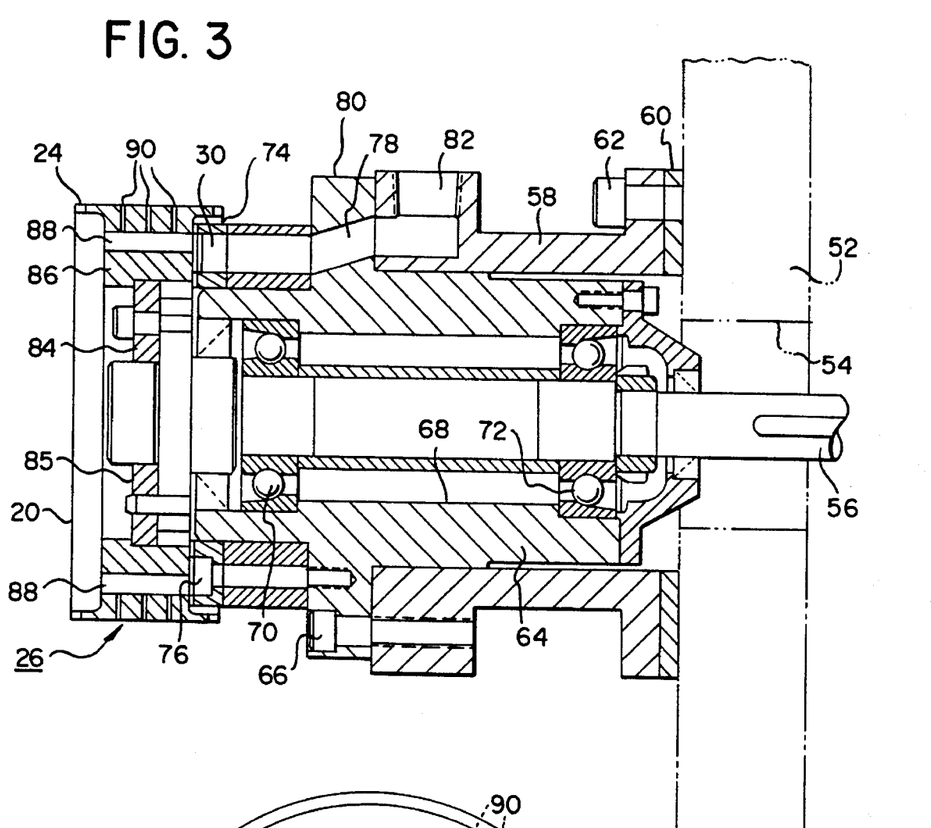
FIG. 3 shows an elevation section view taken along line 3—3 of FIG. 1.
Figure 4:
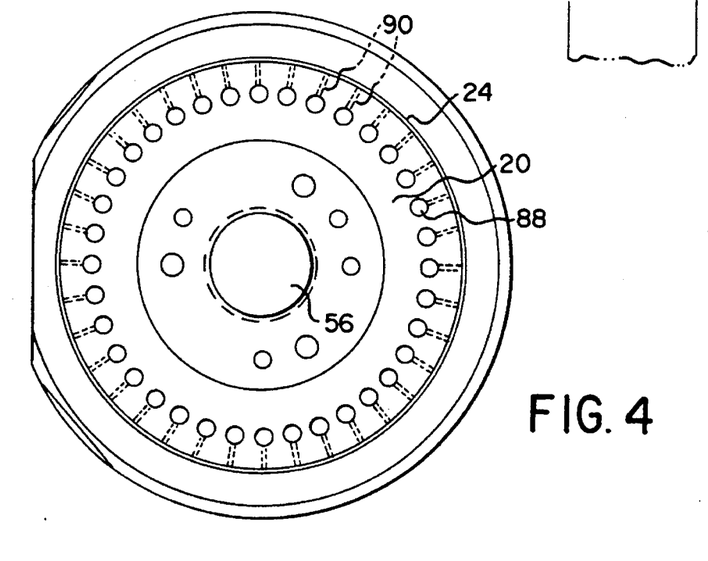
FIG. 4 shows an elevation view as seen from the left of FIG. 3.
Figure 5:
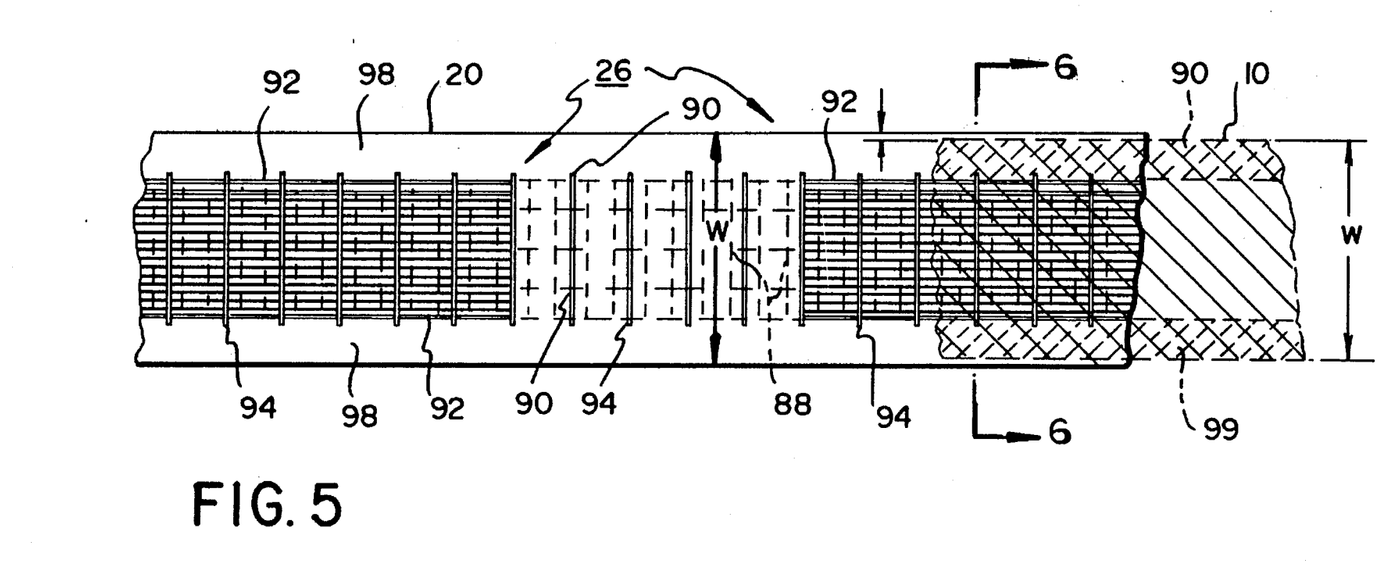
FIG. 5 shows a fragmentary projected view of the array of axial and circumferential grooves and radial bores provided in the cylindrical surface of the drum of FIGS. 3 and 4.
Figure 6:
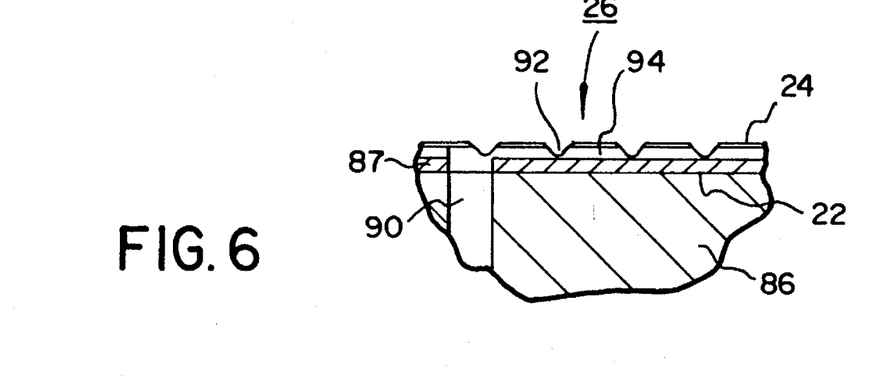
FIG. 6 shows a fragmentary section view taken along line 6—6 of FIG. 5.
Figure 7:
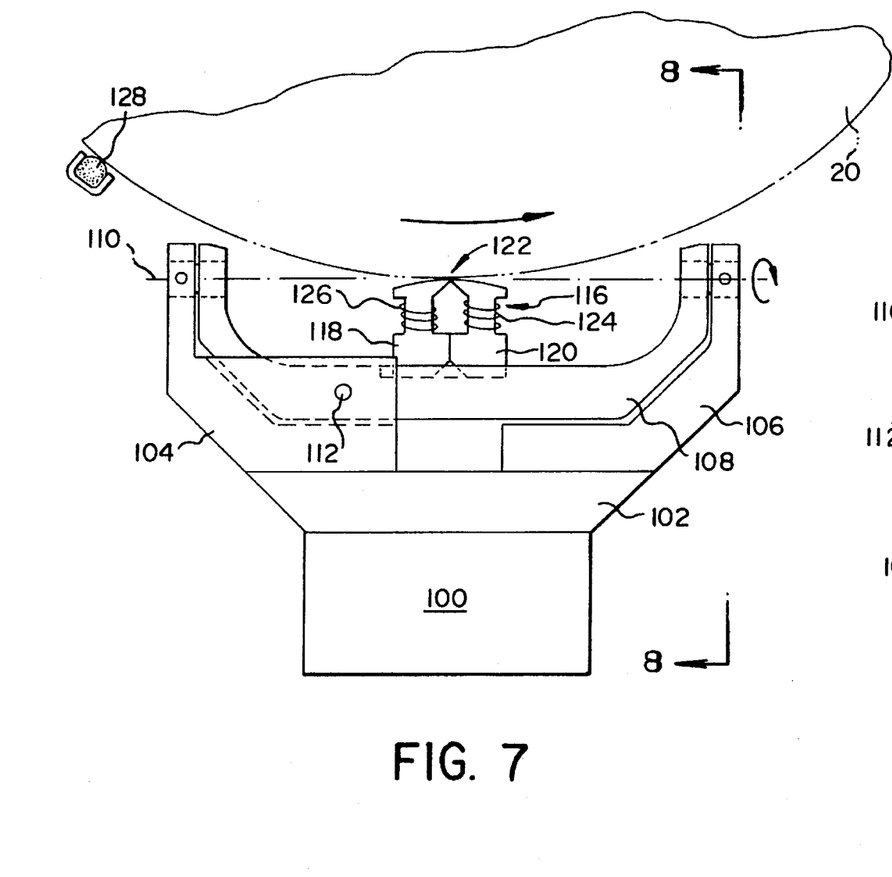
FIG. 7 shows a schematic front elevation view of a suitable apparatus for recording to the drum of FIGS. 3 and 4.
Figure 8:
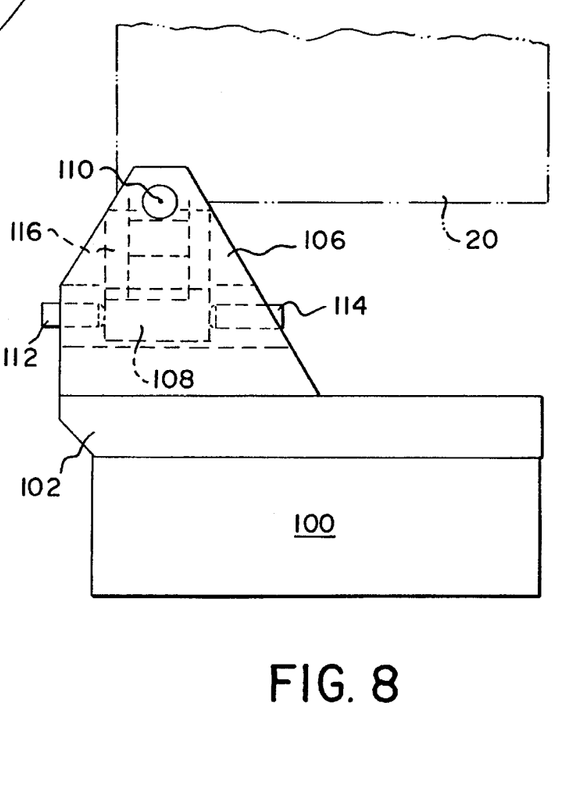
FIG. 8 shows a side elevation view of the apparatus of FIG. 7, as seen from the right in FIG. 7.

Turning to FIGS. 3 and 4, the apparatus of FIGS. 1 and 2 is mounted on a rigid, typically vertical face plate 52, illustrated in phantom lines. A port 54 extends through face plate 52 to provide passage for the drive shaft 56 which rotates drum 20 in the embodiment of FIG. 1. In the embodiment of FIG. 2, no drive shaft is provided but the structure of drum 20 is otherwise the same. On the front side of face plate 52, a cylindrical housing 58 is mounted by means of a spacer plate 60 and a plurality of bolts 62. Within housing 58, a cylindrical bearing housing 64 is mounted by a plurality of bolts 66. A central bore 68 in bearing housing 64 supports a pair of bearings 70, 72 for shaft 56. Surrounding the front end of bearing housing 64 is a vacuum stator ring 74 which comprises an approximately 180° exhaust plenum 30, as discussed with regard to FIG. 1. A plurality of bolts 76 secure stator ring 74 to bearing housing 64. A passage 78 extends from exhaust plenum 30 through a flange 80 on bearing housing 64 and communicates with a connection port 82 for attachment to a source of subatmospheric pressure such as a vacuum pump, not illustrated. At the front end of shaft 56, a stainless steel hub 84 is mounted by suitable fasteners. Hub 84 is press fitted into a bore within an annular titanium or aluminum vacuum drum rotor 86. Exterior circular cylindrical surface 22 preferably is provided with a layer 87 of electroless copper approximately 0.017 to 0.020 inch (0.043 to 0.051 cm) in thickness, as shown in FIG. 6, before master magnetic layer 24 is applied, in the manner to be described. To facilitate uniform application of layer 24 and thereby to provide a smooth surface to contact web 10, the cylindrical surface of layer 87 preferably is machined, by turning in contact with a single point diamond tool, to be perpendicular to surface 85 of hub 84 to within a tolerance of 0.000025 inch (0.000064 cm). The surface finish preferably should be in the range of 0.00000025 to 0.000001 inch (0.00000064 to 0.0000025 cm). Surface 22 also could be contoured concavely to provide an increase in the normal force typically generated by tension in web 10 and the vacuum applied to array 26. Such a contour would modify the tension profile in the web so that improved intimate contact would be established at the edges of the web where information transfer is to occur. As shown in FIGS. 3 to 6, around the circumference of rotor 86 are provided a plurality of axial bores 88 which are radially positioned to communicate with exhaust plenum 30 as drum 20 rotates, the opposite ends of bores 88 being plugged. A layer of a high lubricity material such as Teflon or Rulon, not illustrated, may be applied to the surface of stator ring 74 facing rotor 86, to minimize leakage. Each axial bore 88 communicates with a plurality of radial bores 90 which preferably are approximately 0.031 inch (0.079 cm) in diameter and extend outward past surface 22 and through layers 24 and 87. On the cylindrical surface of drum 20, array 26 preferably comprises a plurality of circumferential grooves 92 which preferably are 0.013 to 0.017 inch (0.033 to 0.043 cm) wide, 0.005 to 0.010 inch (0.0127 to 0.0254 cm) deep and spaced on a 0.052 inch (0.132 cm) pitch. Grooves 92 are intersected at bores 90 in an orthogonal array by a further plurality of axial grooves 94 which preferably are 0.010 inch (0.0254 cm) wide, 0.010 to 0.015 inch (0.0254 to 0,038 cm) deep and spaced on a 0.350 inch (0.889 cm) pitch. Other patterns of radial bores, axial grooves and circumferential grooves may be used without departing from the scope of the invention. In FIG. 5, a length of the circumferential grooves has been omitted to show more clearly the relative positions of bores 88 beneath axial grooves 94. As shown schematically in FIG. 5, a web 10 of width w preferably is approximately 0.060 inch (0.152 cm) narrower than the width W of drum 20. The presence of bores 90 and grooves 92, 94 could interfere with recording onto master magnetic layer 24 and with transfer of information from master magnetic layer 24 to slave magnetic layer 14. So, array 26 preferably is confined to the central portion of the exterior cylindrical surface of drum 20, thus leaving on each edge of the cylindrical surface an annular zone 98 which preferably is approximately 0.213 inch (0.54 cm) wide to provide sufficient space for recording on the edge bands 99 of a strip of photographic film, as seen in FIG. 5. Thus, the axial width of zone 98 is several multiples larger than the pitch between grooves 92. When web 10 is wrapped onto drum 20, anticlastic deformation of the web occurs to some extent along edge bands 99 where, as noted in the discussion of the background of the invention, the most intimate contact is needed to ensure good transfer of information. Then, application of vacuum through across the web, the differential bores 90 and grooves 92, 94 causes a pressure differential being not larger than the magnitude of atmospheric pressure, which substantially overcomes the anticlastic deformation and causes the master layer 24 of each of annular zones 98 to form an intimate interface with the surface of the slave layer of magnetic recording medium on side 14 to permit anhysteretic transfer of information from the master to the slave. The vacuum applied is best at the center of array 26 but extends beyond the circumferential and axial grooves to annular zones 98 to ensure good contact with edge bands 99 on web 10. The quality of the vacuum achieved beneath web 10 can vary as a function of applied tension, anticlastic effect, curl induced in web 10 by relative humidity, edge burrs and the like. Preferably, a vacuum in the range of about 15 to 25 inches (38.1 to 63.5 cm) of mercury is applied at connection port 82 to ensure removal of entrained air and the necessary intimate contact. FIGS. 7 and 8 illustrate an apparatus suitable for recording onto layer 24. A conventional positioning stage 100 is used which position an object along three orthogonal axes and about an axis of rotation perpendicular to the axis of drum 20. Mounted on stage 100 is a yoke 102 having a pair of spaced arms 104, 106. Between arms 104, 106 a cradle 108 is pivotably mounted for limited movement about an axis if rotation 110 which, in operation, is positioned essentially tangent to the surface of layer 24 on drum 20. The range of movement of cradle 108 is needed to account for variations in the geometry of drum 20 from a perfect circular cylinder and can be adjusted by means such as set screws 112, 114. Mounted on cradle 108 facing drum 20 is a recording head 116 comprised of a pair of ferrite pole pieces 118, 120. A gap 122 is provided between pole pieces 118, 120 at the point of tangency with drum 20, gap 122 preferably having a length of about 0,010 mm and a depth of about 0,080 mm. The radial clearance between drum 20 and head 116 typically does not exceed 0.002 mm during recording. Windings 124, 126 are provided on pole pieces 118, 120 in the usual way. As will be understood by those skilled in the magnetic recording arts, the geometry of recording head is chosen in accordance with known techniques to provide an appropriate flux density for recording onto layer 24. A lubricant pad 128 may be provided to minimize chances of galling the surface of drum 20 during recording due to intimate contact between the polished head surface and the very smooth surface of drum 20.

As previously indicated, layer 24 of magnetic recording medium preferably comprises an intrinsically high coercivity alloy of cobalt and platinum sputtered over a suitable underlayer such as chromium. A process for applying such a layer is disclosed in commonly assigned, copending U.S. application Ser. No. 07/905,026 filed 26 June 1992. The type of sputtering apparatus is not critical, and may be, for example, a DC or RF magnetron sputtering apparatus. For example, the film may be sputtered onto a drum 20 using a TRIMAG sputtering apparatus. The sputtering takes place in an atmosphere which includes a mixture of an inert gas, such as, for example, argon or xenon, and a quantity of hydrogen gas. The presence of a sufficient amount of hydrogen apparently displaces residual oxygen that might otherwise be present. When a sufficient amount of hydrogen is present in the sputtering chamber, the resultant CoPt based film exhibits excellent magnetic properties. Also, if the surface of drum 20 is to be pretreated prior to sputtering, the presence of hydrogen during pretreatment steps, such as during a glow discharge sputtering pretreatment, positively affects the coercivity of the resulting film.

In sputter deposition processes, prior to the deposition of metal films, the interior of the sputtering chamber is pumped down, for example, by a cryopump to a suitable vacuum base pressure. For example, the base pressure is less than $5 \times 10^{-7}$ torr. After the desired vacuum is achieved, the surface of drum 20 preferably is pretreated using a glow discharge pretreatment, which may be in an inert gas atmosphere. More preferably, the glow discharge pretreatment is conducted in an atmosphere of hydrogen and an inert gas. It should be noted that the purpose of the glow discharge pretreatment is to prepare the surface for the next film to be deposited, and is not necessarily critical to achieving high coercivity films. However, surface preparation by glow discharge, etc., is recommended since films deposited using this technique typically exhibit higher coercivities. After pretreatment, the system is pumped down to the previous base pressure. A suitable underlayer coating, such as, for example, copper, tungsten or chromium, is then sputtered onto the surface of drum 20. A preferred undercoat material is chromium. Preferably a mixed inert gas and hydrogen gas atmosphere is used for deposition of the undercoat. The hydrogen content in the sputtering chamber during undercoat deposition is preferably greater than 4 mole percent, more preferably greater than 10 mole percent, and most preferably greater than 20 mole percent. The undercoat is typically deposited at a thickness of about 120 nm, although layer 24 is operable for other undercoat thicknesses. In order to facilitate explanation, however, the CoPt magnetic films discussed herein will be restricted to those having an undercoat of chromium approximately 120 nm thick.

After the underlayer is deposited, the surface of the underlayer is preferably pretreated by exposure to a glow discharge. The glow discharge is preferably conducted in a hydrogen and argon containing atmosphere. The hydrogen content in the sputter chamber during glow discharge pretreatment is preferably greater than 4 mole percent, more preferably greater than 10 mole percent, and most preferably greater than 20 mole percent. Glow discharge of the chromium underlayer prior to CoPt deposition has a beneficial effect on the coercivity of the entire magnetic film, particularly when it occurs in an atmosphere containing hydrogen. In systems which utilize cryopumps, i.e., those that are not capable of efficiently removing hydrogen gas from the deposition chamber, hydrogen content in the deposition chamber can be increased by allowing a hydrogen containing gas to "flow" into the chamber. In one apparatus used to apply layer 24, for example, a constant flow of a mixture of 4 percent $H_2$ in argon gas into the sputter chamber would result in atmospheres having hydrogen mole fractions greater than 4 percent, due to the inefficiency of the cryopump in removing hydrogen. Consequently, in some of the following examples, the percentage of hydrogen in the atmosphere was increased by conducting a "flow" of 4 percent hydrogen in argon gas into the sputter chamber. For example, this procedure was successfully conducted in several instances prior to glow discharge pretreatment, in order to conduct the glow discharge in an atmosphere containing a sufficient mole fraction of hydrogen.

After surface pretreatment of the underlayer by glow discharge, a film of CoPt is sputter deposited over the underlayer film. A preferred composition for the CoPt layer is about 80 atomic percent Co, 20 atomic percent Pt. In order to achieve high coercivity magnetic films, it is important that the CoPt be deposited in an atmosphere containing a sufficient amount of hydrogen. The coercivities of the deposited CoPt films generally increase as the concentration of hydrogen during CoPt deposition increases. A beneficial effect on the coercivity of these films is very noticeable at concentrations of hydrogen during CoPt deposition as low as 17 percent mole fraction. Substantial increases in coercivity have been achieved using hydrogen mole fractions of 20 percent and above. More preferably, hydrogen mole fraction is at least 30 percent, and most preferably the hydrogen mole fraction is at least 50 percent. In atmospheres containing argon and about 30–50 percent mole fraction hydrogen, for example, magnetic Cr/CoPt films have been deposited having coercivities above 2400 Oe. Vacuum base pressure prior to deposition is preferably maintained at about the $10^{-7}$ torr range or lower. More preferably, the base pressure is maintained below $5 \times 10^{-7}$ torr. One or more of the deposition steps described above (glow discharge pretreatment, underlayer deposition, CoPt deposition, etc.) also may be performed utilizing an atmosphere containing xenon, preferably in a concentration of at least 5 mole percent. For example, deposition of the CoPt in atmosphere containing xenon and hydrogen has resulted in coercivities above 2900 Oe, at thicknesses of about 200 nm. Following deposition of the CoPt, an abrasion resistance layer preferably is applied using material and processes familiar to those skilled in the art.

The process for applying layer 24 may be more easily comprehended by reference to the following example. It must be understood, however, that this example is provided only for purposes of illustration.

EXAMPLE

The following processes were conducted in a conventional DC TRIMAG sputtering apparatus having a vacuum system pumped by a conventional cryopump. The sputtering chambers were provided with commercially available sputtering guns and targets capable of depositing a chromium underlayer and a CoPt toplayer (80 atomic percent Co). The inert sputtering gas was Ar (purity:UHP, 5–9's). When $H_2$ was used, it was in the form of a 4 percent mixture with Ar. However, because the cryopump being used to maintain vacuum pressure was not capable of efficiently removing hydrogen, the $H_2$ content in the sputter chamber rose to mole fractions greater than 4 percent. In the following processes A through F, an approximately 120 nmCr underlayer and an approximately 400 nm CoPt film were deposited in varying atmospheres to compare the effect of $H_2$ gas during deposition and/or glow discharge pretreatment. To increase the amount of hydrogen in the sputtering chamber, a gaseous mixture of 4 percent hydrogen in argon was allowed to flow into the chamber for a period of time, during which only argon was being substantially removed by the cryopump. For each process, the sputtering chamber atmosphere was analyzed immediately after CoPt deposition using a residual gas analyzer (RGA). Residual hydrogen, oxygen, and water contents were determined by analyzing the RGA scan using the "total peaks" method. The results are listed in Table 1 below. Also listed in Table 1 are coercivity (HC) in oersteds, squareness ratio (SR), and C-axis orientation ratio (Ratio) for each process. The C-axis orientation was determined by analyzing the films using x-ray diffraction, and then calculating the ratio of the intensities of the (002)/(100)+(101) x-ray diffraction peaks. Generally, the smaller this ratio is, the greater the in-plane orientation of the C-axis of the hexagonal CoPt crystals and the better the squareness. Base pressure prior to either of the film (Cr or CoPt) depositions was less than $2.5 \times 10^{-7}$ torr. For each of process A through F, the substrates were held in a cylindrical configuration and rotated above the sputtering source during deposition to imitate deposition onto a cylindrical recording drum.

Process A illustrates a preferred process. Process B generally illustrates a deposition technique disclosed in U.S. Pat. No. 4,902,583. Processes C through F are identical to Process B, except that, in each of the Processes C through F, one of the Process B steps is conducted in a $H_2$ and Ar atmosphere, rather than in an argon atmosphere.

PROCESS A

The substrate surface was first given a 20-min glow discharge pretreatment in Ar, after which the system was pumped to the previous 'Base Pressure'. A film of Cr approximately 120 nm thick was then deposited in an Ar atmosphere. The sputter chamber and the surface of the Cr film were then prepared using a glow discharge pretreatment. The sputtering chamber was given a 5-min flow of 4 percent $H_2$ in Ar gas to increase the hydrogen mole fraction in the sputtering atmosphere, followed by 10-min glow discharge in the Ar and $H_2$ atmosphere, followed by another 5-min flow with 4 percent $H_2$ in Ar gas. A mixture of 4 percent $H_2$ in Ar was then allowed to flow into the sputtering chamber as a film of CoPt was deposited by sputter deposition. As evidenced by the residual gas results listed in Table 1, which were measured immediately after CoPt deposition, hydrogen mole fraction rose a considerable amount over the 4 percent that was being added to the sputtering chamber, due to the cryopump's inefficiency at removing hydrogen.

PROCESS B

While argon gas was allowed to flow into the sputtering chamber, the substrate surface was first pretreated with a glow discharge for 20 minutes, followed by pumping the sputter chamber back to the original base pressure and then sputtering an underlayer of chromium in an argon atmosphere on the substrate. Up to this point, Process B is the same as Process A. However, in the subsequent steps, unlike Process A, there was no glow discharge pretreatment, and only argon gas was allowed to flow into the deposition chamber as the CoPt film was deposited. The 14.7 percent residual hydrogen detected immediately after CoPt deposition (see Table 1) was due to prior experiments which included hydrogen gas in the sputtering gas.

PROGRESS C

The substrate surface was first pretreated with a glow discharge for 20 minutes in argon, after which the sputter chamber was pumped back to the original base pressure. A mixture of 4 percent hydrogen in argon gas was then allowed to flow into the sputter chamber. An underlayer coating of Cr was deposited in the resultant atmosphere of 4 percent $H_2$ in Ar. Argon gas was then allowed to flow into the sputter chamber as a CoPt film was deposited over the Cr underlayer.

PROCESS D

A mixture of 4 percent $H_2$ in argon gas was allowed to flow into the sputtering chamber. The substrate surface was then pretreated with a glow discharge in the resultant $H_2$ and Ar mixed atmosphere. The sputter chamber was then pumped back to the original base pressure and an underlayer of Cr was sputtered as argon gas was circulated into the sputtering chamber. Argon gas was then allowed to flow into the sputter chamber, and a CoPt film was then deposited in the resultant argon atmosphere.

PROCESS E

The substrate surface was first pretreated with a glow discharge for 20 minutes as argon gas was circulated into the chamber. This was followed by pumping the sputter chamber back to the original base pressure and then sputtering an underlayer of chromium on the substrate as argon was circulated into the chamber. A CoPt film was then deposited as a 4 percent $H_2$ in argon gas mixture was circulated into the sputtering chamber.

PROCESS F

The substrate surface was first pretreated with a glow discharge for 20 minutes in the presence of an argon flow, followed by pumping the sputter chamber back to the original base pressure and then sputtering an underlayer of chromium on the substrate in the presence of an argon flow. The sputtering chamber was then given a five minute flow of 4 percent hydrogen in argon, after which a 10 minute glow discharge was conducted in the resultant hydrogen and argon atmosphere. A film of CoPt was then deposited as argon gas was pumped into the sputtering chamber.

TABLE 1

| Process Used | Ratio | Hc (Oe) | SR | $RH_2$ | $RO_2$ | $RH_2O$ |
|---|---|---|---|---|---|---|
| Process A | 0.430 | 2456 | 0.741 | 51.7 | 1.0 | 30.2 |
| Process A | 0.376 | 2313 | 0.735 | 39.7 | 6.1 | 28.8 |
| Process A | 0.172 | 2416 | 0.748 | 32.6 | 2.2 | 50.7 |
| Process B | 0.709 | 1883 | 0.706 | 14.7 | 2.0 | 52.3 |
| Process C | 1.449 | 2050 | 0.691 | 17.4 | 3.5 | 46.5 |
| Process D | 1.075 | 2134 | 0.697 | 17.9 | 2.4 | 47.6 |
| Process E | 0.152 | 2027 | 0.740 | 26.8 | 3.1 | 47.3 |
| Process F | 0.179 | 2086 | 0.768 | 3.8 | 0.1 | 61.0 |

As evidenced by Table 1, films utilizing hydrogen in one or more of the deposition steps generally exhibited better in-plane orientation of the C-axis, higher coercivity, and better squareness. More importantly, the use of hydrogen during glow discharge and/or Cr or CoPt deposition increased coercivity, as evidenced by comparing Process B results to Processes C through F. Further, note that the film prepared using Process A had coercivities of from 2313 to 2456 Oe. The highest value reported previously for a CoPt magnetic film about 2000 Oe.

Using the process just described, a magnetic film having a single 1500 nm CoPt film was deposited on a rotating substrate, resulting in a coercivity of 1800 Oe. Because the films can be deposited at such great thicknesses while maintaining their high coercivity, these films are more efficient in anhysteretic recording application than previously known magnetic films. This advantage over prior art methods is particularly noticeable when compared to other CoPt films deposited on rotating substrates.

Table 2 below illustrates the detrimental effect a rotating substrate has on prior-art CoPt deposition processes, while films prepared using the process just described remain relatively unaffected by rotation. The values listed under prior art are reported values taken from U.S. Pat. No. 4,902,583.

TABLE 2

| | For CoPt films 400–500 nm thick Coercivity, Oe | |
|---|---|---|
| | Process A | Prior Art |
| Static | >= 2400 | 1850–2000 |
| Rotating | >= 2400 | 1500–1750 |

While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to secure Letters Patent for:

1. Apparatus for anhysteretically recording information, comprising:

a web bearing a first, magnetic recording medium, said web having a first pair of opposed edges separated by a first width of said web;

a circular cylindrical drum having an exterior cylindrical surface with a second pair of opposed edges separated by a second width;

at least one layer of a second, magnetic recording medium applied to said cylindrical surface, said layer extending in a band around said cylindrical surface, said layer being in position to contact said first, magnetic recording medium, when said web is wrapped onto said drum, in an annular zone defined by an interface between said layer and said web;

said web being wrapped onto said drum whereby anticlastic deformation occurs in said web at said interface;

means associated with said drum for applying subatmospheric pressure through said cylindrical surface and said layer only at locations spaced from said annular zone, so that a differential pressure acts on said web to substantially overcome said anticlastic deformation and cause said web to establish sufficiently intimate contact with said layer in said annular zone to anhysteretically transfer information from said layer to said web; and means for applying a magnetic bias field to cause said transfer in said annular zone.

2. Apparatus according to claim 1, wherein said layer extends across said cylindrical surface to contact said first, magnetic recording medium in a pair of said annular zones, one along each of said first, opposed edges.

3. Apparatus according to claim 1, wherein said means for applying comprises:

a plurality of axially spaced, circumferential grooves through said layer;

said annular zone having an axial width several multiples larger than the axial spacing between said circumferential grooves;

a plurality of axial grooves through said layer, said axial grooves intersecting said circumferential grooves and terminating outside said annular zone;

a plurality of radial bores extending from said grooves into said drum; and means for applying subatmospheric pressure to said radial bores over an arc of a circumference of said drum, whereby subatmospheric pressure is applied between said web and said drum.

4. Apparatus according to claim 1, wherein said first, magnetic recording medium has a mean coercivity in the range of 500 to 1500 Oe; and said second, magnetic recording medium has a mean coercivity in the range of 1900 to 2600 Oe.

5. Apparatus according to claim 4, wherein said second, magnetic recording medium is an 80/20 alloy of cobalt and platinum, said layer having been sputtered onto said cylindrical surface.

6. Apparatus according to claim 1, further comprising:

means for driving said drum at an essentially constant velocity to meter said web through said apparatus;

a first means, upstream of said drum, for applying tension to said web approaching said drum; and a second means, downstream of said drum, for applying tension to said web leaving said drum.

7. Apparatus according to claim 1, further comprising:

means for mounting said drum for rotation in response to movement of said web;

means for applying tension to said web approaching said drum;

a metering roll downstream of said drum;

means for driving said metering roll at an essentially constant velocity to meter said web through said apparatus; and means for applying tension to said web leaving said metering roll.

8. Apparatus according to claim 1, wherein said second width is at least as long as said first width.

9. A method for anhysteretically recording information, comprising the steps of:

providing a web bearing a first, magnetic recording medium, said web; having a first pair of opposed edges separated by a first width of said web:

providing a circular cylindrical drum having an exterior cylindrical surface with a second pair of opposed edges separated by a second width; at least one layer of a second, magnetic recording medium applied to said cylindrical surface, said layer extending in a band around said cylindrical surface in position to contact said first, magnetic recording medium, when such a web is wrapped onto said drum, in an annular zone defined by an interface between said layer and said web;

wrapping said web around an arc of said drum to define said interface between said first, magnetic recording medium and said second, magnetic recording medium, whereby anticlastic deformation occurs in said web at said interface;

applying subatmospheric pressure through said cylindrical surface and said layer only at locations spaced from said annular zone, so that a differential pressure acts on said web to substantially overcome said anticlastic deformation and cause said web to establish sufficiently intimate contact with said layer in said annular zone to anhysteretically transfer information from said layer to said web;

rotating said drum; and applying a magnetic bias field to cause said transfer in said annular zone.

10. A method according to claim 9, wherein said second width is at least as long as said first width.

11. Apparatus for anhysteretically recording information, comprising:

a web bearing a first, magnetic recording medium, said web having a first pair of opposed edges separated by a first width of said web;

a circular cylindrical drum having an exterior cylindrical surface with a second pair of opposed edges separated by a second width;

at least one layer of a second, magnetic recording medium applied to said cylindrical surface, said layer extending in a band around said cylindrical surface, said layer being in position to contact said first, magnetic recording medium, when said web is wrapped onto said drum, in at least one annular zone defined by at least one interface between said layer and said web, said annular zone being positioned along at least one of said second pair of opposed edges;

said web being wrapped onto said drum whereby anticlastic deformation occurs in said web at said interface;

means associated with said drum for applying subatmospheric pressure through said cylindrical surface and said layer only at locations spaced from said annular zone, so that a differential pressure acts on said web to substantially overcome said anticlastic deformation and cause said web to establish sufficiently intimate contact with said layer in said annular zone to anhysteretically transfer information from said layer to said web; and means for applying a magnetic bias field to cause said transfer in said annular zone.

12. Apparatus according to claim 11, wherein said layer extends across said cylindrical surface to contact said first, magnetic recording medium in a pair of said annular zones, one along each of said first, opposed edges.

13. Apparatus according to claim 11, wherein said means for applying comprises:

a plurality of axially spaced, circumferential grooves through said layer;

said at least one annular zone having an axial width several multiples larger than the axial spacing between said circumferential grooves;

a plurality of axial grooves through said layer, said axial grooves intersecting said circumferential grooves and terminating outside said annular zone;

a plurality of radial bores extending from said grooves into said drum; and means for applying subatmospheric pressure to said radial bores over an arc of a circumference of said drum, whereby subatmospheric pressure is applied between said web and said drum.

14. Apparatus according to claim 13, wherein said first, magnetic recording medium has a mean coercivity in the range of 500 to 1500 Oe; and said second, magnetic recording medium has a mean coercivity in the range of 1900 to 2600 Oe.

15. Apparatus according to claim 14, wherein said second, magnetic recording medium is an 80/20 alloy of cobalt and platinum, said layer having been sputtered onto said cylindrical surface.

16. Apparatus according to claim 11, further comprising:

means for driving said at an essentially constant velocity to meter said web through said apparatus;

a first means, upstream of said drum, for applying tension to said web approaching said drum; and a second means, downstream of said drum, for applying tension to said web leaving said drum.

17. Apparatus according to claim 11, further comprising:

means for mounting said drum for rotation in response to movement of said web;

means for applying tension to said web approaching said drum;

a metering roll downstream of said drum;

means for driving said metering roll at an essentially constant velocity to meter said web through said apparatus; and means for applying tension to said web leaving said metering roll.

18. Apparatus according to claim 11, wherein said second width is at least as long as said first width.

19. A method for anhysteretically recording information, comprising the steps of:

providing a web bearing a first, magnetic recording medium, said web having a first pair of opposed edges separated by a first width of said web;

providing a circular cylindrical drum having an exterior cylindrical surface with a second pair of opposed edges separated by a second width; at least one layer of a second, magnetic recording medium applied to said cylindrical surface, said layer extending in a band around said cylindrical surface in position to contact said first, magnetic recording medium, when such a web is wrapped onto said drum, in at least one annular zone defined by at least one interface between said layer and said web, said at least one annular zone being positioned along at least one of said second pair of opposed edges;

wrapping said web around an arc of said drum to define said interface between said first, magnetic recording medium and said second, magnetic recording medium, whereby anticlastic deformation occurs in said web at said interface;

applying subatmospheric pressure through said cylindrical surface and said layer only at locations spaced from said annular zone, so that a pressure differential acts on said web to substantially overcome said anticlastic deformation and cause said web to establish sufficiently intimate contact with said layer in said annular zone to anhysteretically transfer information from said layer to said web;

rotating said drum; and applying a magnetic bias field to cause said transfer in said annular zone.

20. A method according to claim 19, wherein said second width is at least as long as said first width.

\* \* \* \* \*